(12) United States Patent
Heimanowski et al.

(10) Patent No.: US 9,909,574 B1
(45) Date of Patent: Mar. 6, 2018

(54) ELECTROTHERMAL SPACE THRUSTER HEATER FOR DECOMPOSABLE PROPELLANTS

(71) Applicant: CU Aerospace, LLC, Champaign, IL (US)

(72) Inventors: Neil J. Heimanowski, Urbana, IL (US);
Curtis A. Woodruff, Urbana, IL (US);
Rodney L. Burton, Urbana, IL (US);
David L. Carroll, Urbana, IL (US)

(73) Assignee: CU Aerospace, LLC, Champaign, IL (US)

( * ) Notice: Subject to any disclaimer, the term of this patent is extended or adjusted under 35 U.S.C. 154(b) by 0 days.

(21) Appl. No.: 15/143,857

(22) Filed: May 2, 2016

Related U.S. Application Data

(60) Provisional application No. 62/156,527, filed on May 4, 2015.

(51) Int. Cl.
| | | |
|---|---|---|
| *F03H 1/00* | (2006.01) | |
| *F02K 9/97* | (2006.01) | |
| *F02K 9/42* | (2006.01) | |
| *F02K 9/62* | (2006.01) | |

(52) U.S. Cl.
CPC ........... *F03H 1/0093* (2013.01); *F02K 9/425* (2013.01); *F02K 9/62* (2013.01); *F02K 9/97* (2013.01); *F05D 2210/14* (2013.01)

(58) Field of Classification Search
CPC .... F03H 1/0006; F03H 1/0012; F03H 1/0018; F03H 1/0081; F03H 1/0087; F03H 1/0093; B64G 1/406; F02K 9/62; F02K 9/97; F02K 9/425; F05D 2210/14
See application file for complete search history.

(56) References Cited

PUBLICATIONS

Mezyk "Resistojet thruster with a power system based on supercapacitors" 2014.*
White "The Decomposition of Ammonia at High Temperatures" 1905.*
CSUS "Chemical Kinetics" 2010.*

* cited by examiner

*Primary Examiner* — William H Rodriguez
*Assistant Examiner* — William Breazeal
(74) *Attorney, Agent, or Firm* — Adam K. Sacharoff; Much Shelist, P.C.

(57) ABSTRACT

A method for operating self-pressurizing propellants in space thruster chambers and nozzles heated by resistive, radiative or nuclear methods at temperatures hundreds of degrees above the decomposition temperature. The method is defined by reducing the chamber volume Vc and increasing the nozzle throat area A* such that a propellant vapor with sonic velocity a* experiences a high temperature residence time that is less than 10 milliseconds. In other aspects of the invention propellant vapor is formed from a self-pressurizing propellant and the residence time is such that the propellant vapor does not decompose nor does the propellant vapor polymerize to a solid.

5 Claims, 9 Drawing Sheets

ELECTROTHERMAL SPACE THRUSTER HEATER FOR DECOMPOSABLE PROPELLANTS

CROSS REFERENCE TO RELATED APPLICATIONS

This applications claims benefit to U.S. Provisional Application 62/156,527 filed on May 4, 2015 and is hereby incorporated herein by reference.

STATEMENT OF GOVERNMENT SUPPORT

This invention was made with government support under NNX13CC64P with further support under NNX14CC04C awarded by The National Aeronautics and Space Administration. The Government has certain rights in the invention.

BACKGROUND OF THE INVENTION

An emerging trend in the field of space exploration is the development and deployment of low mass satellites, commonly referred to as micro-, nano-, or femto-satellites. These satellites are seeing increasing use as a low-cost alternative to more traditional large-scale spacecraft, a notable example being the CubeSat standard, and eventually as components in a durable, redundant satellite network. Nanosats ere designed for a life of 1-2 years. They often have body-mounted solar panels, which makes them severely power limited, with usable specific power P/m of ~1 watt per kg of satellite mass (note that the Lockheed-Martin A2100 bus used for geosynchronous satellites has 4000 W capability and a launch mass of ~3000 kg, so the 1 W/kg rule of thumb holds over a wide range of satellite masses). CubeSats are also volume limited (1 liter per cube), placing a severe volume constraint on the propulsion system. Nanosats are a low-cost, easily replaced approach to satellite constellations, and as such need to be nimble. That is, orbital maneuvers need to be accomplished relatively quickly to minimize mission control costs and maximize the usable satellite duty cycle of 1-2 years. Although rapid orbital maneuvering can always be accomplished by chemical propulsion, scaling down chemical systems to nanosat size (thrust<<1 Newton) has proved difficult for solid and liquid propulsion systems. Thus, one impediment to wide implementation of nanosats is the lack of a highly compact, simple, and efficient propulsion system for primary (orbital transfer, drag makeup, and maneuvering) and secondary (attitude and trajectory control) applications. CHIPS eliminates this impediment by providing an integrated solution for both primary propulsion and attitude control, enabling nano-, micro-, and even larger satellites to perform various mission tasks including orbit transfer, de-orbiting, station keeping, and position, attitude and acceleration control for multiple satellites in formation.

SUMMARY OF THE INVENTION

Nanosatellites are a cost-effective alternative to large-scale spacecraft; the CubeSat form factor in particular is increasingly utilized for a number of academic, commercial and government missions, but the nature of the platform imposes severe power, mass and volume constraints which often force users to forgo primary propulsion, limiting mission duration and on-orbit operations. The CubeSat High-Impulse Propulsion System (CHIPS) provides an attractive solution to this problem by integrating 3-axis attitude control with a high-impulse micro-resistojet primary propulsion system and supporting subsystems into a bolt-on package. System volume is in line with typical reaction wheel+magnetorquer combinations for nanosats, and the optional battery pack allows CHIPS to operate in power-limited systems.

R134a was selected as the baseline propellant for CHIPS because of its appealing characteristics as a propellant and benign nature in comparison to other options such as hydrazine or sulfur hexafluoride. Testing performed on the superheater cartridge (SHC) showed minimal losses with a heating efficiency of 77%. This allows for a maximum performance of 82 s $I_{sp}$ with 30 mN thrust at an input power of 30 W, resulting in an estimated total impulse of 563 N-s for the 1.0 U+ baseline system while requiring as little as 1 W from the bus power supply with the optional battery pack.

The increasingly successful use of nanosatellites has made CubeSat an attractive form factor for a number of missions that require both an attitude control system (ACS) and primary propulsion. The CubeSat High Impulse Propulsion System (CHIPS), under development by CU Aerospace with partner VACCO Industries, is designed to enable CubeSat mission operations beyond simple orbit maintenance, including significant altitude changes, formation flying, and proximity operations such as rendezvous and docking. CHIPS integrates primary propulsion, ACS and propellant storage into a single bolt-on module that is compatible with a variety of non-toxic, self-pressurizing liquid propellants. The primary propulsion system uses micro-resistojet technology developed by CU Aerospace to superheat the selected propellant before subsequent supersonic expansion through a micro-nozzle optimized for frozen-flow efficiency. The 1 U+ baseline design is capable of providing an estimated 563 N-s total impulse at 30 mN thrust using R134a propellant, giving an impulse density of 552 N-s/liter. The ACS is a cold gas, 4-thruster array to provide roll, pitch, yaw, and reverse thrust with a minimum impulse bit of 0.4 mN-s. An engineering prototype, with integrated pressure control, power control, and data logging, was extensively tested in cold and warm gas modes on the University of Illinois thrust stand under a range of conditions. This paper presents thrust and specific impulse data for the resistojet thruster using two different propellants. Resistojet data include cold and warm gas performance as a function of mass flow rate, plenum pressure, geometry, and input power.

DETAILED DESCRIPTION OF THE INVENTION

NANOSATELLITE THRUSTER CHOICES—An important question for nanosatellites is: what range of efficiency and specific impulse are appropriate for a nanosat electric micropropulsion system? TRL 9 EP systems have flown with efficiency η (%) and specific impulse $I_{sp}$ (s) including the pulsed plasma thruster (10%, 1000 s); the resistojet (50-80%, 300 s); the Hall thruster (50%, 2000 s); and the ion thruster (70%, 3000 s). Other EP systems in advanced development are the colloid thruster; and the FEEP thruster. Propulsion selection for nanosats depends on the propulsion capability, expressed in terms of the maneuver time and the required orbital maneuver expressed in terms of ΔV, and also on the mass and volume available for the propulsion system on the nanosat.

The prior art includes an equation for a constrained maneuver time that showed ΔV varying inversely with $U_e$; a priori, this is counterintuitive because high ΔV interplanetary missions typically utilize high specific impulse systems. The conclusion is that, in order to minimize orbit transfer times, more maneuver capability is available for propulsion systems with low exhaust velocity and specific impulse. To insist incorrectly on a high specific impulse is to incur a long time to perform the maneuver or to limit the ΔV capability of the nanosat.

Figure 1:
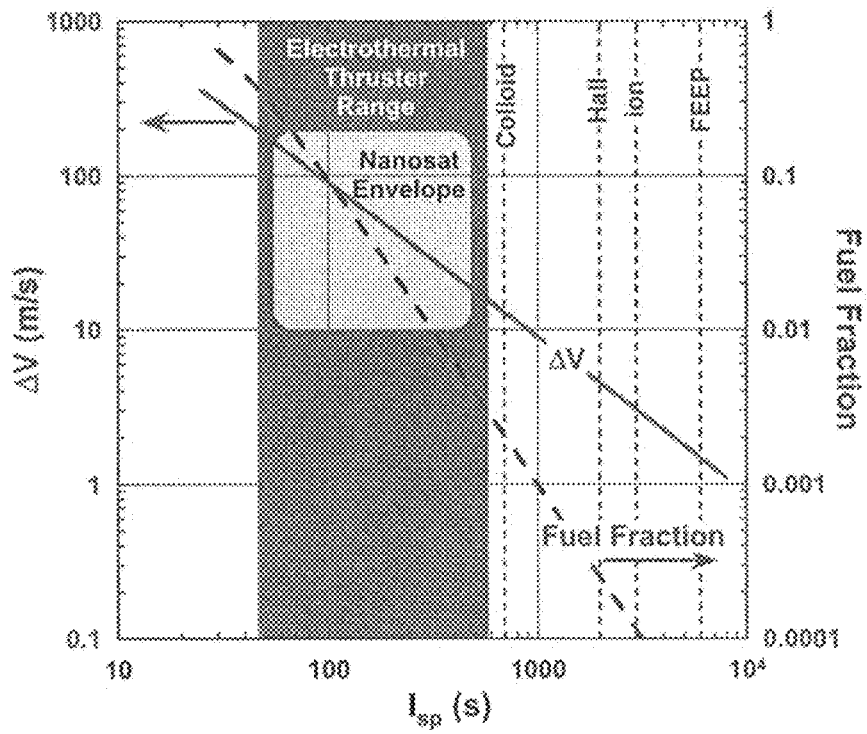
FIG. 1 is a prior art chart showing an operating envelope for nanosat propulsion.

Clearly, the maneuver time t is a fundamentally important parameter. The question then is what maneuver time is appropriate? Because we are dealing with low-cost nanosats with limited design life (1-2 years) in a rapid response environment, it is not useful to have maneuver times of weeks or months and their associated delayed response, high mission control support costs and satellite downtimes. It is more reasonable that the time to perform a maneuver should be measured in days. FIG. 1 discloses an operating envelope for nanosat propulsion. Maneuver time is one day, requiring high thrust and reducing specific impulse to the electrothermal range. FIG. 1 illustrates some typical values of ΔV per day for a maneuverable nanosat, as a function of $I_{sp}$. We assume that ηφ~0.50 (where φ is the power fraction $P_p/P$, defined in terms of the propulsive power $P_p$, and the maximum nanosat bus power P produced by the solar panels), P/m~1 W/kg, and that the desired time for a single maneuver is 1.0 days.

As provided in the prior art, the "sweet spot" for nanosat orbital maneuvers (shaded region) appears to be in the 70-400 s range of where ΔV is relatively large but the fuel fraction is reasonably small, FIG. 1. For 50 s, typical of cold gas thrusters, ΔV is high but fuel fraction is too large. For 2000 s, assuming a 50% efficient Hall thruster, the ΔV per day is only 4.3 m/s; for 3000 s, assuming a 50% efficient ion thruster, the ΔV per day is only 2.9 m/s; and for a 6000 s FEEP thruster, the ΔV per day is only 1.5 m/s. These latter ΔV values are too small to be useful in time-constrained maneuvers. The colloid thruster could eventually be considered assuming significant improvements in efficiency and system volume.

It is noted that a nanosat propulsion system can operate from batteries. For a 5 kg, 5 W nanosat operating for one day, the required energy is 432 kJ=120 W-hr. Lithium-ion batteries of this size would have a mass of about 1 kg, or 20% of the satellite mass, making battery operation possible, but requiring a large fraction of the total nanosat mass. Batteries could be used in conjunction with photovoltaic cells to increase power and decrease maneuver time, effectively providing φ>1.

Unlike low power ion and Hall thrusters, which incur a large efficiency penalty from their neutralizers, electrothermal thrusters in principle can operate at high efficiency at low $I_{sp}$. The reason that ion and Hall thrusters need high $I_{sp}$ to be efficient is that the exhaust is fully ionized, so that the kinetic energy of the exhaust must be large compared to the energy required (ion cost) to ionize the xenon propellant. Low power electrothermal thrusters on the other hand have no inherent requirement for ionized propellant, which can be operated with an ionization fraction of zero for the resistojet, The conclusion from this discussion is that the best specific impulse range for nanosats is relatively low, in a range favoring electrothermal thrusters, FIG. 1.

PROPELLANT SELECTION—Propulsion performance is critically dependent on the propellant choke. A number of propellants have been considered for CubeSats, including isobutane ($C_4H_{10}$), nitrous oxide ($N_2O$), propane, ammonia, hydrazine, peroxide, refrigerants (R134a), etc. A study of 350 candidate propellants for the CubeSat/nanosatellite propulsion application was executed, and down-selected to 9 candidates. Selection is based on the following criteria, Tables 1 and 2. (Note that $SO_2$ has also previously been denoted as EP-13.)

TABLE 1

Criteria for best candidate nanosatellite propellants.

| Criterion | Justification | Favorable for | Not favorable for |
| --- | --- | --- | --- |
| High liquid density ρ | max propellant mass and ΔV | Water, $SO_2$, R134a, R236fa | $NH_3$, $N_2O$, $C_4H_{10}$ |
| High ρ × sound speed | max ΔV | $H_2O$, $N_2H_4$, $SO_2$, $NH_3$, R134a, R236fa | $SF_6$, $N_2O$, $C_4H_{10}$ |

TABLE 1-continued

Criteria for best candidate nanosatellite propellants.

| Criterion | Justification | Favorable for | Not favorable for |
|---|---|---|---|
| Low heat of vaporization | low propellant heater power | $SO_2$, R134a, R236fa | $H_2O$, $N_2H_4$, $NH_3$ |
| Self-pressurizing | simplifies feed system | $SO_2$, $NH_3$, R134a, R236fa | $H_2O$, $N_2H_4$, $N_2O$ |
| Critical temperature >60° C. | liquid between 0° C. and 60° C. | $H_2O$, $SO_2$, $NH_3$, R134a, R236fa | $N_2H_4$, $SF_6$, $N_2O$, $C_4H_{10}$ |
| Low freezing point | liquid between 0° C. and 60° C. | $SO_2$, $NH_3$, R134a, R236fa | $H_2O$, $N_2H_4$ |
| Compatible with materials & electronics | Enables location of electronics inside storage tank | R134a, R236fa, $C_4H_{10}$, $SO_2$ | $H_2O$, $NH_3$ |
| Overall Selection | Optimizes Propulsion System | R134a, R236fa | $H_2O$, $N_2H_4$, $NH_3$, $SF_6$, $N_2O$, $C_4H_{10}$, $SO_2$ |

Because both cold and warm gas could be used, the primary selection criterion is the product ρa of liquid density and sound speed at 300 K, or equivalently the product of liquid density and maximum cold $I_{sp}$, Table 2. A secondary criterion is the propellant heat of vaporization.

The third criterion is self-pressurization capability, which eliminates the need for a separate pressurization system, saves mass and volume, and therefore increases propellant mass and impulse. Propellants are selected with sufficient vapor pressure at 0° C. and modest pressure at 60° C to avoid excessive tank wall thickness and mass (note that thicker tank walls can significantly reduce propellant volume in the small tank sizes necessitated for CubeSats). Propellants with a critical temperature below 60° C. ($SF_6$, $N_2O$, $C_4H_{10}$) are avoided because the initial tank fill must be low to avoid over-pressurization at 60° C.

and $SO_2$. Note that R134a and R236fa are widely used, and $SO_2$ was formerly used, as commercial refrigerants. The non-toxic, inert and stable nature of R134a and R236fa tip the scales in their favor, making them an ideal green propellant for future CubeSat missions.

Figure 2:
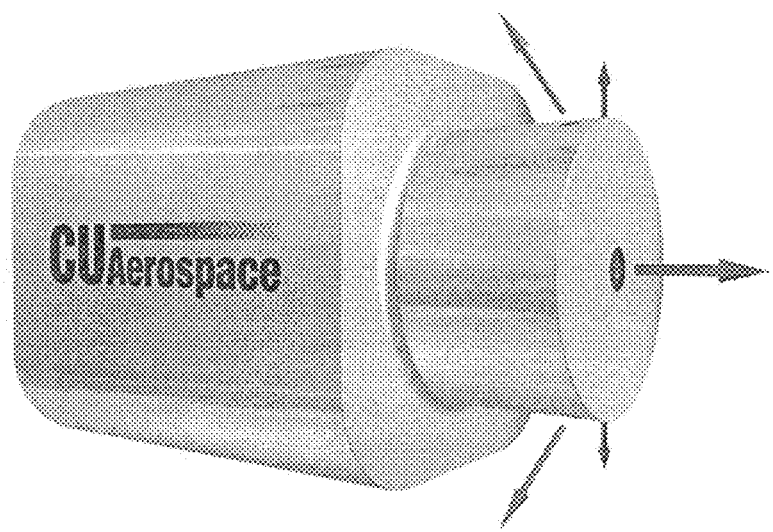
FIG. 2 is a rendering of a baseline 1.0 U+ CHIPS flight system showing locations and orientation of the main and ACS thrusters.

CHIPS DESIGN—the CubeSat High Impulse Propulsion System, FIG. 2, is a complete nanosatellite propulsion solution offering a high-performance micro-resistojet for primary, propulsion and 3-axis cold gas attitude control. FIG. 2 is a rendering of a baseline 1.0 U+ CHIPS flight system showing locations and orientation of the main and ACS thrusters. The propellant tank and optional energy reservoir are included in the structure, Building on experience from prior nanosat propulsion product development, CHIPS integrates all necessary propulsion subsystems into a bolt-on unit, including control and power processing units,

TABLE 2

Comparison of product of liquid density and 90% of maximum $I_{sp}$ at 500° C. for nanosatellite propellants.

| Propellant | Mol. Weight (g/mole) | Density (g/cm³) | Isp at 500° C. & 90% Nozzle Eff. (s) | Density × Isp (g-s/cm³) | Issues |
|---|---|---|---|---|---|
| $H_2O$ | 18 | 1.002 | 155.1 | 155.4 | Freeze @ 0° C., low vapor pressure |
| $N_2H_4$ | 32 | 1.008 | 116.3 | 117.2 | Toxic, Freezes @ 2° C. |
| $SO_2$ | 64 | 1.381 | 82.2 | 113.6 | Manageable Low toxicity |
| $NH_3$ | 17 | 0.609 | 159.5 | 95.2 | High P @ 60° C., thick structure |
| R134a | 102 | 1.225 | 65.1 | 79.8 | None |
| R236fa | 152 | 1.373 | 53.4 | 73.3 | Low vapor pressure @ 0° C. |
| $N_2O$ | 44 | 0.785 | 99.2 | 77.8 | Critical temperature <60° C. |
| $SF_6$ | 146 | 1.374 | 54.4 | 74.8 | Critical temperature <60° C. |
| $C_4H_{10}$ | 58 | 0.579 | 86.4 | 50.0 | Low liquid density, $T_{critical}$ <60° C. |

The fourth criterion is materials compatibility with the feed system, thruster and with the control and power electronics. This capability provides a volume-efficient way to package electronics, inside the propellant tank, while providing waste heat to maintain propellant pressure and temperature while evaporating. Testing studies performed by CU Aerospace have identified materials for electronics and valves that are compatible with R134a, R236fa and $SO_2$.

Finally, freezing is a concern for a tank temperature of 0° C. for $H_2O$ and $N_2H_4$, requiring that this risk be mitigated by thermal management and propellant heating. These two propellants, despite high ρa, are also contraindicated by high heat of vaporization and low self-pressurization. Because nanosatellites are generally power limited, the additional heater power required during lengthy LEO eclipse times could significantly impact these nanosatellites. Of the investigated propellants, the three most appealing for the CubeSat operating temperature range of 0-60° C are R134a, R236fa resistojet and ACS thrusters, frictionless micro-solenoid valves, tankage, maintenance systems and software. System set-points, status, and firing telemetry are accessible and configurable through an RS-422 serial interface. The CHIPS baseline propellant is R134a: a self-pressurizing, non-toxic and inert refrigerant in widespread commercial use (R236fa having slightly lower total performance is a good secondary option).

The baseline 1.0 U+ system, targeted at 2 U-6 U CubeSats, occupies 1020 cm³ of total volume and takes advantage of the "hockey puck" space available in the CubeSat PPOD. The 95 mm×95 mm cross section maximizes propellant load while leaving clearance for other CubeSat subsystems such as solar panels. The CHIPS design allows for modifications based on customer-specific mission requirements: the propellant tank may be reduced to as little as 0.5 U or expanded to any desired length, tank width is readily customizable, and the thrusters can be repackaged should the hockey puck volume be unavailable. Propellant from the propellant tank is used as a supply source both for primary thrusters using heated gas, and for attitude control thrusters using unheated cold-gas. If desired, multiple heated- gas thrusters can be used in the same propulsion system. The optional 8.7 Wh energy reservoir included in the baseline allows the user to specify the bus power load (as little as 1 W) during propulsive maneuvers.

Figure 3:
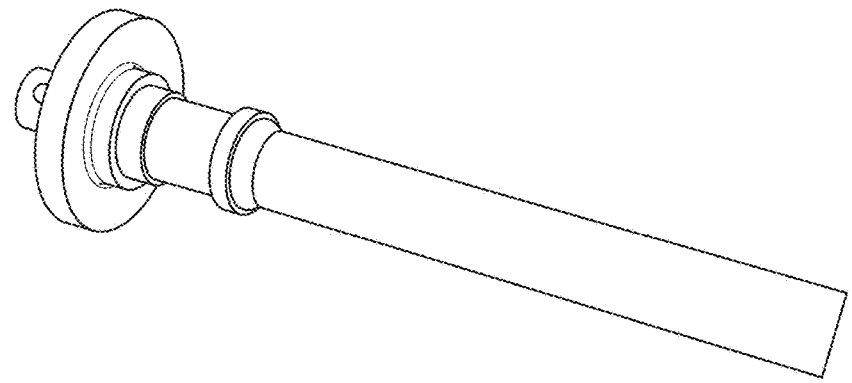
FIG. 3 is a superheater cartridge (SHC) prototype device.

CHIPS RESISTOJET—At the core of CHIPS is the high-efficiency micro-resistojet, the superheater cartridge (SHC), FIG. 3. CHIPS uses resistive heating, although we note that it is possible in general to heat the propellant gas by other methods, such as by solar or laser radiation focused on a chamber through which the propellant flows, or with a nuclear fission heat source. Resistive heating is accomplished by passing current through the small-diameter, thin-walled "superheat" tube which feeds the supersonic micro-nozzle. The superheat tube has been optimized to minimize losses due to thermal conduction and radiation. A coaxial shroud further reduces radiation losses while protecting the superheat tube during handling and transportation. Extensive testing of the SHC has demonstrated a consistent performance in both warm-fire and cold-fire modes, resulting in a total impulse of 563 N-s at 82 s specific impulse, and a maximum impulse density of 552 N-s/liter, Table 3. Impulse density (also known as volumetric impulse) has been shown to be a good metric (figure of merit) for propulsion system capability and degree of system integration in nanosatellite-class spacecraft that are also volume limited.

TABLE 3

Performance specifications of CHIPS primary propulsion in warm and cold-fire modes at nominal 40 mg/s flow rate. Delta-V and Total impulse performance is based on a 1.0 U+ baseline.

| Parameter | Warm Fire Only | Cold Fire Only | Unit |
|---|---|---|---|
| Thrust | 30 | 19 | mN |
| Total impulse | 563 | 323 | N-s |
| Impulse density (total impulse/sys. | 552 | 317 | N-s/liter |
| Delta-V capability (4 kg CubeSat) | 155 | 89 | m/s |
| Specific impulse | 82 | 47 | sec |
| Maximium continuous thrust time | 20 | 60 | min |
| Minimum impulse bit | — | 0.5 | mN-s |

Figure 4:
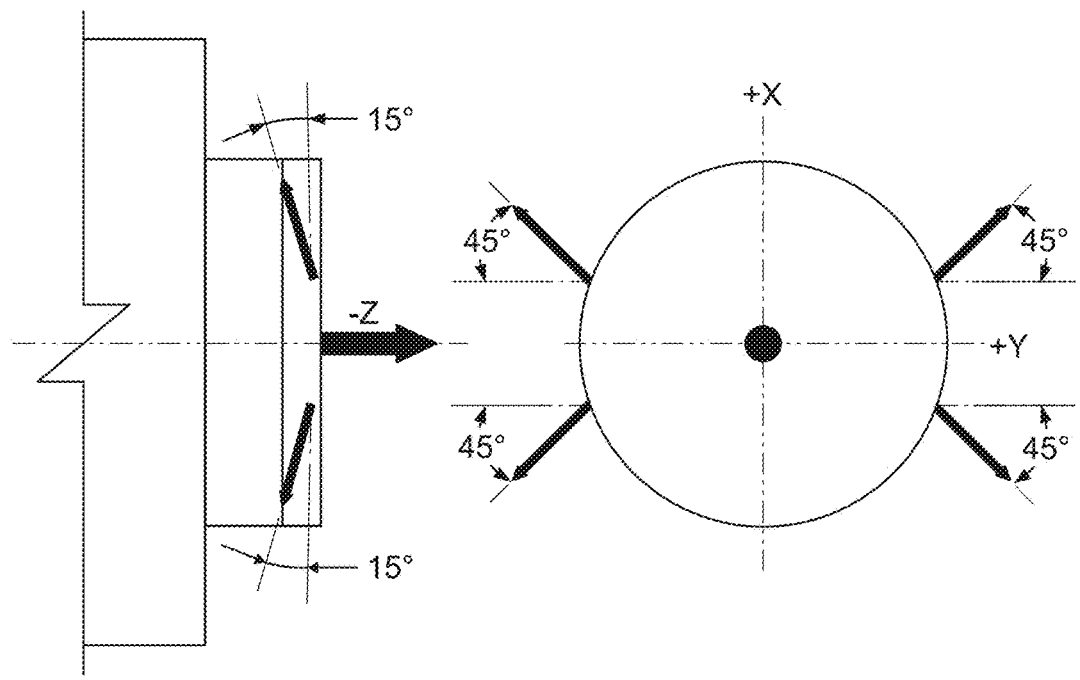
FIG. 4 is a rendering of a thrust vector diagram depicting both primary and RCS thrusters.

CHIPS ACS MODULE—the cold gas thrusters of the CHIPS ACS module are supplied by unheated propellant vapor from the propellant tank, and are located to provide 3-axis stabilized control of satellite attitude when coasting and steering during ΔV maneuvers, FIG. 4. Four cold gas thrusters (BCDE) are equally spaced on the manifold; during ΔV maneuvers they provide a nominal 24 mN of continuous thrust at 47 sec Isp and can be pulsed to provide a OA mN-sec minimum impulse bit, imparting a CubeSat velocity of 100 μm/s. The primary thruster is located such that its 30 mN thrust vector (82 sec Isp) passes through the CubeSat geometric center. When fine adjustments are desired, the feed pressure set point can be tailored to provide a minimum impulse bit as low as 0.18 mN-sec, Table 4.

For ΔV (Z-axis) burns, the satellite is oriented so the Z axis is in the desired direction of acceleration using the attitude control mode, and the primary thruster is fired. Thruster pairs BE or CD are fired to provide steering in yaw (about X), and thruster pairs BC or DE provide steering in pitch (about Y), to correct for any finite mismatch between the satellite CG and the primary thrust vector, For roll control (about Z), thruster pairs BD or CE are used, Initially, the random distribution of relatively dense liquid propellant will cause the CG to he slightly misaligned with the thrust vector. However, as the burn continues the propellant collects at the nozzle end, tending to stabilize the propellant CG along the thrust vector. The internal geometry of the storage volume will naturally damp propellant slosh. For fine control in Z, thrusters BCDE are oriented 15 degrees below the X-Y plane (FIG. 4), and are pulsed to provide −Z maneuvering, while the primary thruster is pulsed for +Z maneuvering.

TABLE 4

ACS thruster specifications.

| Parameter | Cold Fire | Unit | Notes |
|---|---|---|---|
| Max specific | 47 | sec | Nominal |
| Min. Impulse bit | 0.4 | mN-s | ΔV maneuvers, Est. |
| Min. impulse bit | 0.18 | mN-s | Fine maneuvers, |
| Control authority | | Roll, Pitch, Yaw, +X | |

CHIPS FUNCTIONAL DESCRIPTION

Figure 5A:
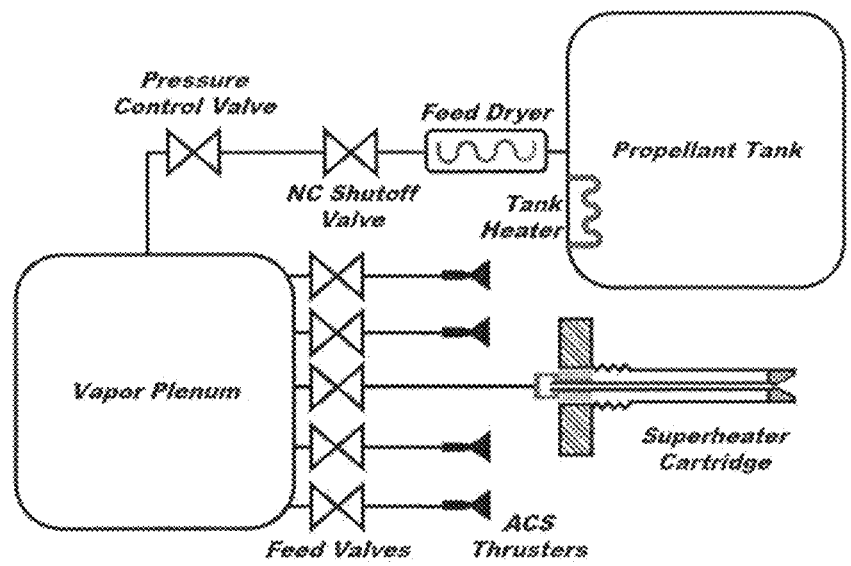
FIG. 5A is a schematic diagram illustrating the CHIPS functionality in accordance with an embodiment of the invention.

The schematic shown in FIG. 5A illustrates CHIPS functionality. The self-pressurizing propellant is stored as a liquid in the integral storage tank, which includes a heater to maintain supply pressure when CHIPS is near the lower operational temperature limit. When a firing sequence is initiated, the shutoff valve is opened and propellant is drawn from the tank through a micro-heat exchanger feed dryer designed to ensure no liquid reaches the vapor plenum. The in-situ CHIPS controller board actively regulates plenum pressure via closed-loop control of the pressure control valve. Feed valves located in the plenum control gas flow to their respective thrusters. All 7 valves in the CHIPS feed system are normally-closed, frictionless soft-seat solenoid micro-valves from VACCO Industries. The propellant tank and vapor plenum are welded against external leakage, and the feed system topology is designed to be dual-fault tolerant against leakage to satisfy Air Force Space Command range safety user requirements. As further illustrated in FIG. 5B, the CHIPS functionality may include multiple super heater cartridges.

Figure 5B:
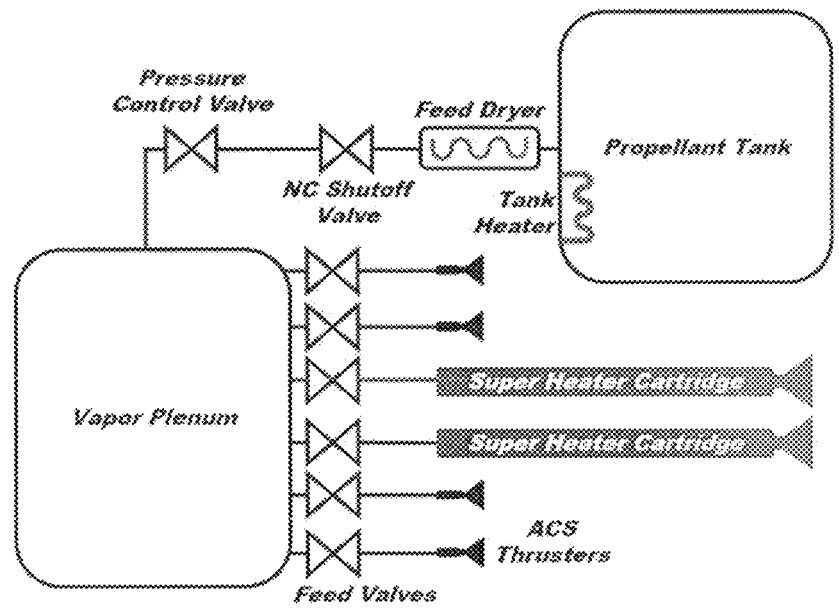
FIG. 5B is a schematic diagram illustrating the CHIPS functionality in accordance with an embodiment of the invention.
Figure 5C:
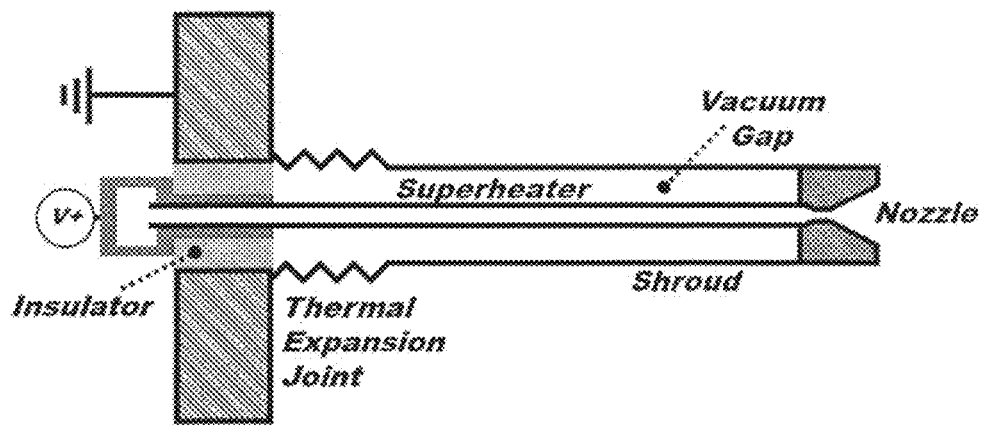
FIG. 5C is a schematic diagram illustrating more details of a CHIPS superheater cartridge in accordance with an embodiment of the invention.

The schematic shown in FIG. 5C illustrates more details of the CHIPS superheater cartridge including: (1) the core superheater tube at voltage V+ (although this could be V−) ; (2) the shroud that is part of the electric circuit, grounded to the thruster body as illustrated; (3) the shroud that can include a reflective internal coating to reflect radiation back towards the superheater tube; (4) the vacuum gap between the superheater and shroud to eliminate thermal conduction losses; (5) the supersonic expansion nozzle; (6) the thermal expansion joint to eliminate compressive stress from thermal expansion of the superheater tube (the joint can take many forms such a bellows or a slip-tube with spring design or other options); and (7) the insulator that prevents electrical contact between the powered and ground sides of the electric circuit thus driving current through the superheater tube.

The CHIPS baseline design includes an optional battery pack mounted in an enclosure on the rear bulkhead of the propellant tank. Charger, maintenance, and survival electronics are integrated into existing electronics that interface with the CHIPS controller board. In order for the battery pack to supply power to CHIPS, the satellite bus must first activate CHIPS; this ensures that CHIPS will remain powered off unless intentionally activated in order to satisfy common launch service requirements. The battery pack enables high-performance ΔV maneuvers while allowing the mission to decide how much power is supplied by the satellite bus via software (e.g. if bus power draw is set to 1 W, CHIPS can fire at full power for 20 min before the pack must be recharged, giving ~9 m/s ΔV). Charge rate and timing is also configured via software, allowing the customer to schedule charging around payload operations.

System Features include: (a) Two operational modes: (i) Warm gas mode for high specific impulse, large total impulse; and (ii) Cold gas mode for minimum or small total impulse maneuvers; (b) Control authority: roll, pitch, yaw, +/−Z; (c) On-orbit update of system parameters, including: (i) Thrust duration, (ii) Plenum pressure (thrust); (iii) Superheater power level (specific impulse); and (iv) Temperature & fault set-points; (d) Telemetry and status packets for system monitoring; (e) Dedicated propellant heater for continuous operation below +0° C. ambient temperature; (f) Propellant pressure sensor for closed-loop propellant temperature regulation; (g) Propellant vaporizer ensuring 100% vapor delivered from liquid storage; (h) High-reliability, frictionless valve propellant feed system including: (i) VACCO micro-valves tested to 200,000+ cold gas firings; and (ii) Double-fault tolerant against leakage; and (j) High-density, self-pressurizing R134a baseline propellant: (i) Green, non-toxic, non-flammable & inert; and Chemically stable, high critical temperature, low freezing point & vapor pressure.

Figure 5D:
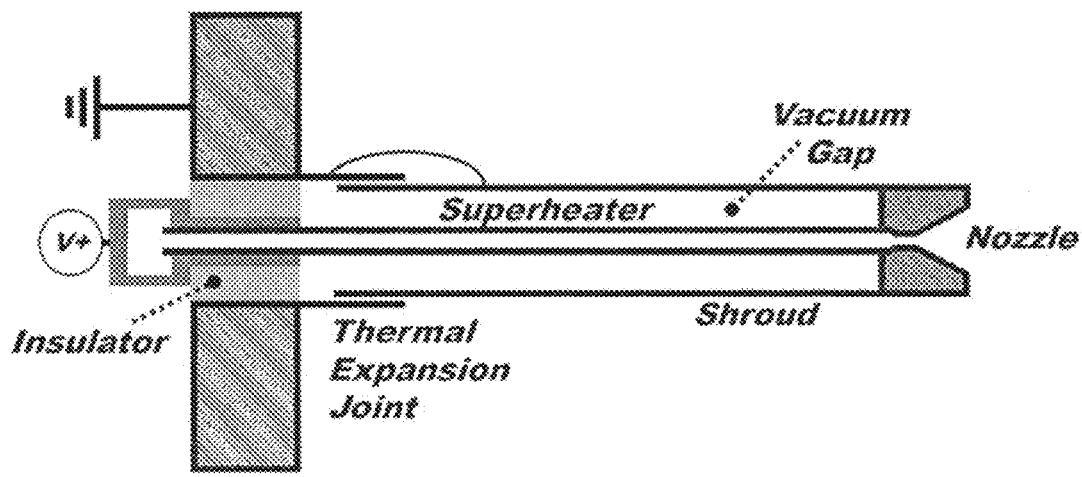
FIG. 5D is a schematic diagram illustrating the CHIPS functionality in accordance with an embodiment of the invention with multiple heated-gas thrusters that can be used in the same propulsion system.

Continuing to refer to FIGS. 5a and 5b and with further reference to FIG. 5C (a sliding sheath and flexible wire electrical connection for the thermal expansion joint), electrothermal thrusters are a class of space thrusters, primarily used on spacecraft such as orbiting satellites, for which a pressurized propellant vapor is heated to high temperature in a heat exchanger, and then expanded to high exhaust velocity in a converging-diverging supersonic vacuum nozzle. The total exhaust momentum created by the high velocity propellant mass (the impulse) produces an equal and opposite momentum in the spacecraft, changing its position, velocity and trajectory as desired. With reference to FIG. 5D, multiple heated-gas thrusters can be used in the same propulsion system.

Because the mass of propellant on the spacecraft is typically limited, it is desirable to maximize the exhaust momentum by maximizing the exhaust velocity. Although several factors determine the exhaust velocity, it is well known that for a given propellant, the exhaust velocity for a chemical or electrothermal thruster increases with the maximum propellant temperature Tc in the heating chamber. The maximum propellant temperature in turn depends on two primary factors: the maximum service temperature of the thruster materials, and the maximum service temperature of the propellant.

For many propellants the maximum service temperature greatly exceeds that of the thruster materials. All thruster materials have a practical service temperatures below 3000 C, but monatomic (e.g.. helium, argon, xenon), diatomic (e.g., hydrogen, nitrogen) and some polyatomic (e.g. water, ammonia) gases have service temperatures greatly in excess of 3000 C before they dissociate or ionize. For these propellants the thruster materials limit the propellant temperature Tc.

For an important class of propellants the decomposition temperature is below 1000 C and therefore limits Tc. These propellants are self-pressurizing, with saturated vapor pressures in the range of 10 to 300 atmospheres at temperatures of 0 C to 60 C, so that propellant can be fed to the heating chamber without the need for pumps or auxiliary pressurant gases, an important feature for very small spacecraft. Examples of self-pressurizing propellants are tetrafluoroethane (CH2FCF3), also called R-134a, hexafluoropropane (C3H2F6), also called R-236fa, and isobutane (C4H10), All of these propellants are known to decompose when heated to moderate temperatures.

For the important case of propellant tetrafluoroethane (R-134a), the decomposition temperature was measured by using a pressure method, and found to be 368 C. In order to achieve high exhaust velocity, it is necessary to raise the maximum propellant temperature Tc well above this decomposition temperature to a temperature higher than 600 C. Furthermore, because the propellant is being heated by heat transfer, by means of a heat exchanger in the thruster, the propellant at the heat exchanger surface must be exposed to a temperature 50 C to 500 C higher than Tc without decomposing, which implies a peak wall temperature of at least 650 to 1100 C. Under these conditions, and for long residence times of the propellant vapor in the chamber, the tetrafluoroethane can polymerize to a white solid with the brand name Teflon. When this happens, the thruster nozzle can become clogged before all the stored propellant is consumed.

For tetrafluoroethane, we have been able to operate at wall temperatures of 650 to 1100 C by minimizing the total residence time of high temperature exposure in the thruster chamber to a maximum of 0.010 seconds (10 milliseconds), This time is achieved by minimizing the chamber volume Vc and increasing the volume flow rate, sonic velocity times throat area (a*A)* through the nozzle throat. Thus the parameter of interest for the residence time is Vc/(a*A*), which is proportional to the residence time τ

The preferred embodiment for the chamber is a capillary tube of length Lc and flow area Ac. The tube wall can be used either as a resistive element, or as a flow duct with a separate heating element. In these cases, the elements are heated with electrical current. For a capillary tube the residence time parameter becomes:

$$\tau \propto \frac{L_c A_c}{a^* A^*}$$

and the residence time τ can be decreased by increasing the throat area A*.

Figure 6:
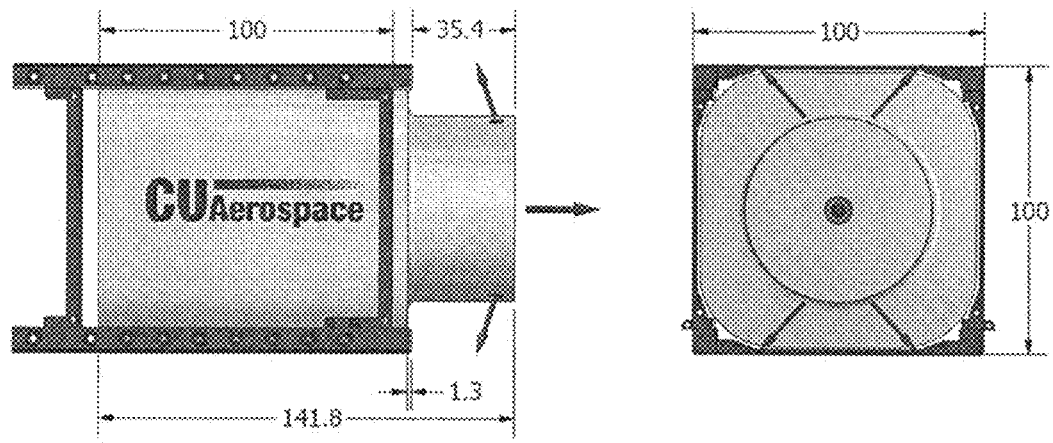
FIG. 6 is an illustration of a CHIPS in a CubeSat frame.

FIG. 6 shows an illustration of CHIPS in a standard CubeSat frame. CHIPS is highly adaptable to a wide range of specific geometries and can be designed to accommodate different propellant tanks and configurations.

EXPERIMENTAL RESULTS WITH CHIPS PROTOTYPE

Figure 7:
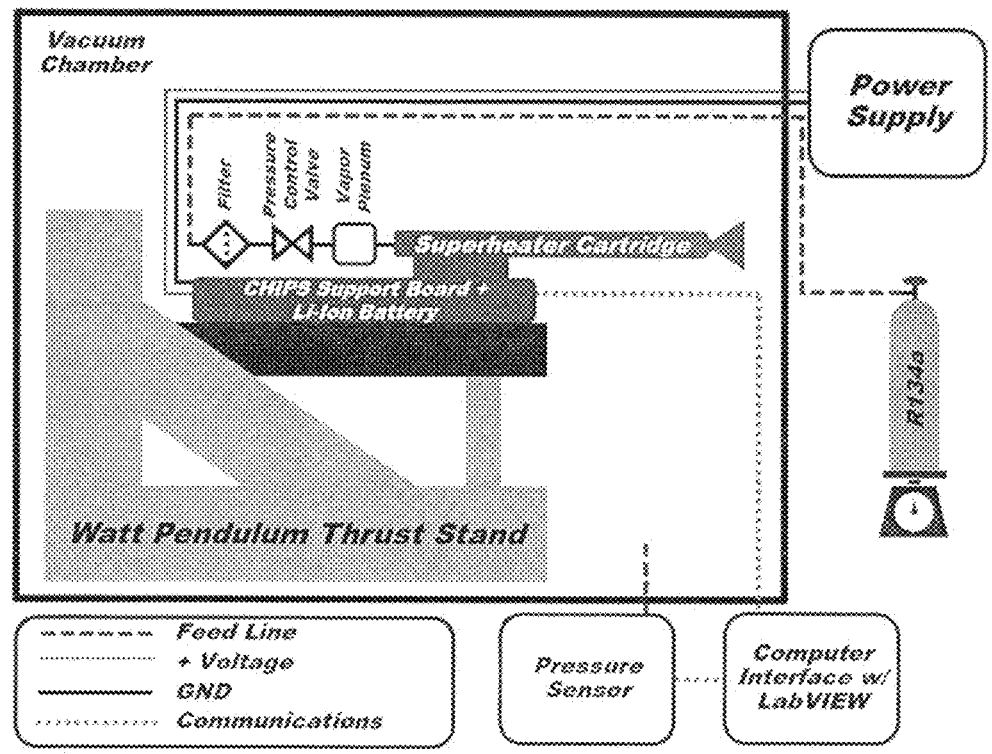
FIG. 7 is a diagram of a CHIPS test apparatus on a thrust stand and further showing the ETFE line as a propellant feed line.

EXPERIMENTAL SETUP—CHIPS thrust testing was performed in the University of Illinois at Urbana-Champaign (UIUC) Electric Propulsion (EP) laboratory. Within the facility's 1.5 m³ vacuum tank is an advanced thrust stand with 8 μN resolution. Thrust stand measurements were taken with a background pressure of approximately 400 milli-Torr. Windage effects from the motion of ambient gas in the tank artificially lower thrust readings, but the correction is within experimental error and is not applied. A diagram of the CHIPS test apparatus on the thrust stand is shown in FIG. 7.

When running on the thrust stand, the CHIPS test apparatus is fed by a propellant bottle (e.g. R134a) external to the tank, and placed on a scale to determine the steady state mass flow rate. Note that thermal mass flow meters proved inconsistent for measuring R134a flow rates. This is a result of the saturated vapor phase propellant upstream of the pressure control valve along with the highly temperature-dependent specific heat of R134a.

Functionally, the test apparatus only differs slightly from the flight configuration. For example, the valve immediately following the vapor plenum is not present on the test apparatus. This makes short, controlled bursts for minimum impulse testing impossible, but this capability exists in the latest prototype hardware. In contrast, sustained, reliable superheater performance has been the major focus since the start of the program, and this is accommodated by the configuration above. The feed dryer and tank heaters are not used since the apparatus is gas fed from a source bottle. The aforementioned hardware upgrade has a feed dryer and self-contained propellant tank. Finally, the results presented do not include ACS thruster performance, as these thrusters have yet to be tested.

The CHIPS support board uses an onboard pressure sensor to measure and control the vapor plenum pressure by operating the pressure control valve. In addition, the board provides a specified amount of power to the superheater cartridge. Power and pressure measurements are recorded by the board via a telemetry stream from the device. Conditions are controlled precisely enough to repeat flow conditions, which has been a useful gauge on system health. Example pressure and power profiles for a typical thrust stand test are presented in FIG. 8 and FIG. 9. A long duration firing is followed by two brief firings. The first burn is to acquire an accurate mass flow measurement for the given firing condition. Tests performed with this apparatus consume at least 16 grams of propellant during this time, as the scale's resolution allows for less than 2% total error with this propellant quantity.

Figure 8:
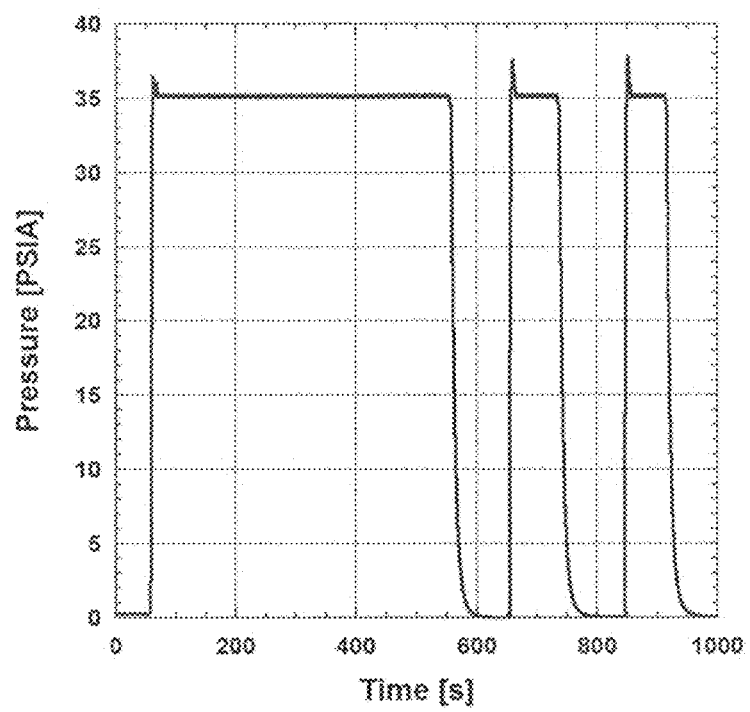
FIG. 8 is a diagram showing plenum pressure readings from CHIPS support board during a thrust stand test.
Figure 9:
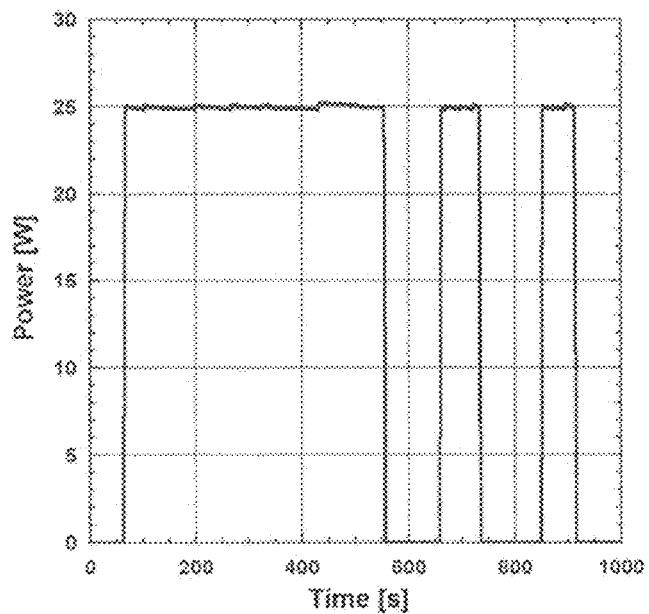
FIG. 9 is a diagram showing power readings from CHIPS support board during a thrust stand test
Figure 10:
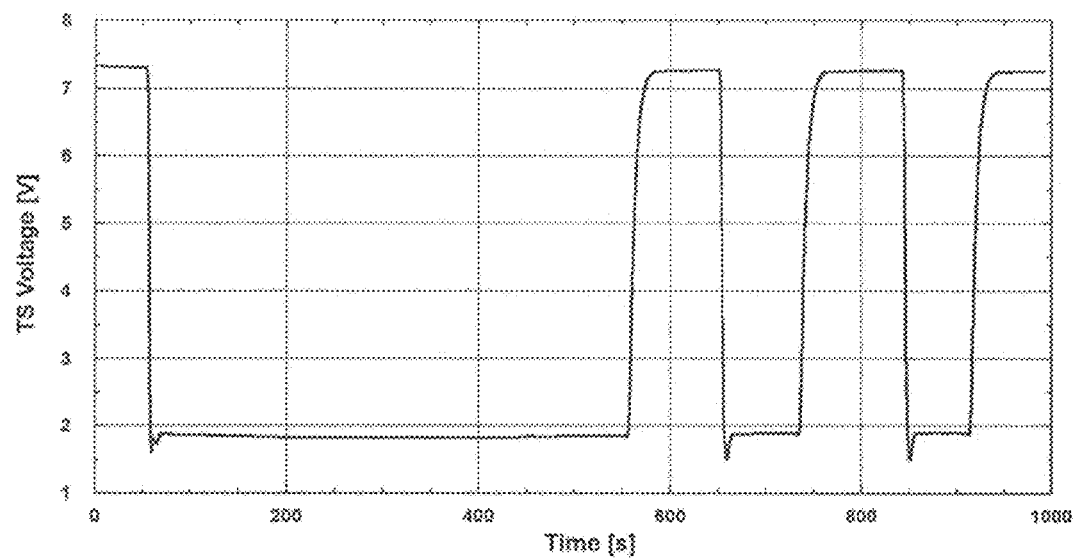
FIG. 10 is a diagram showing thrust stand voltage for a sample thrust stand test.

Thrust measurements are most accurately taken at the beginning and end of a given firing, since the stand can drift over time, and the on state is compared to the off state of the stand. This is why secondary firings are performed after the first, longer burn. The thrust profile corresponding to FIG. 8 and FIG. 9 is shown in FIG. 10. During thruster operation, the thrust stand voltage (TS Voltage) drops from its resting voltage, ~7.5 V, to about 1.9 V. The full range of the thrust stand is calibrated before and after thrusting, so the changes in voltage correspond to thrust values. Note that the overshoots during the activation of the thruster are excluded from thrust measurements or mass flow rate measurements.

EXPERIMENTAL DATA

Figure 11:
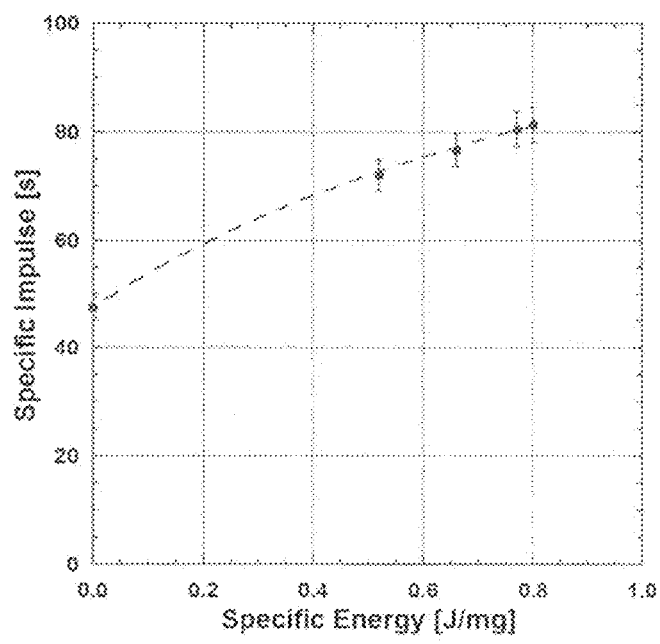
FIG. 11 is a diagram showing $I_{sp}$ vs. specific energy for 37 mg/s R134a with superheater cartridge design.
Figure 12:
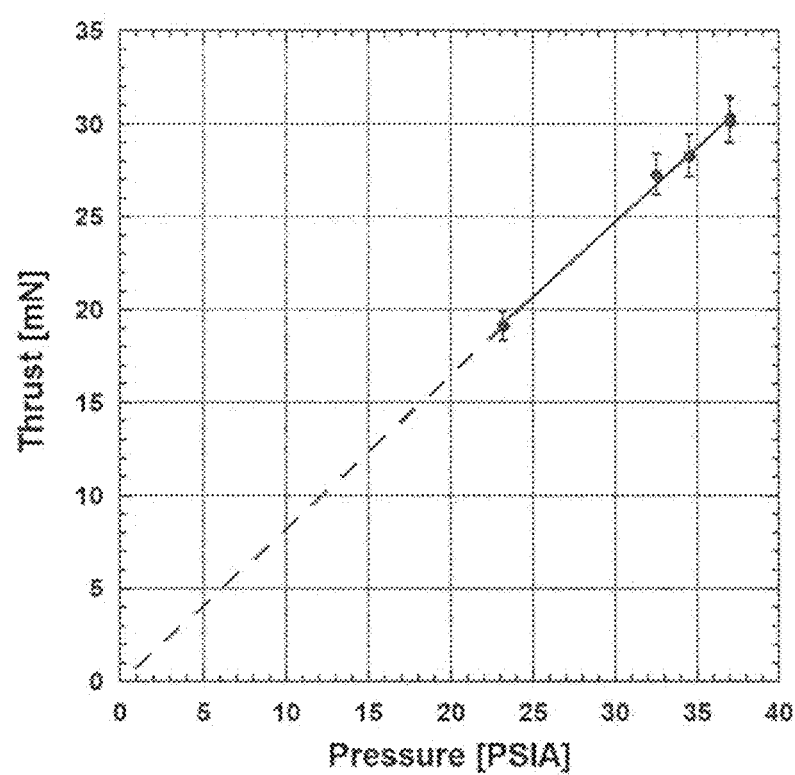
FIG. 12 is a diagram showing thrust vs. pressure for 37 mg/s R134a with superheater cartridge design (higher pressure indicates higher power cases).

Throughout the CHIPS program, there have been several design iterations on both the superheater and its nozzle. These configurations predate the superheater cartridge, which neatly packages the superheater, nozzle, electrical connections, and gas feed. FIG. 11 and FIG. 12 show the latest performance data for the CHIPS superheater cartridge.

The thrust values shown in FIG. 12 correspond to the $I_{sp}$ points in FIG. 11, as the increased specific energy increases the pressure required to maintain the baseline flow rate of 40 mg/s. As shown above, the CHIPS micro-resistojet can exceed 80 seconds $I_{sp}$ with a specific energy of 0.8 J/mg. Note that this case had an input power of 30 W with a mass flow rate of 37 mg/s. Mass flow rate for this case was lower than anticipated for the pressure set-point due to increased heating by the superheater cartridge over previous designs. Since the system is a pressure controlled system, there are variations in the mass flow rate for each case, but this is accounted for by plotting against specific energy instead of power.

Figure 13:
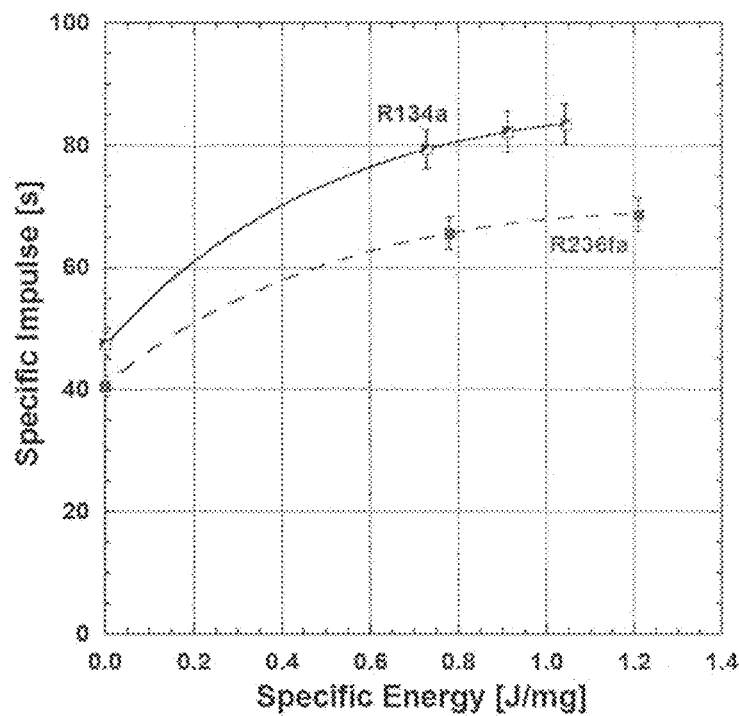
FIG. 13 is a diagram showing $I_{sp}$ vs. specific energy for 25-30 mg/s R134a and R236fa.
Figure 14:
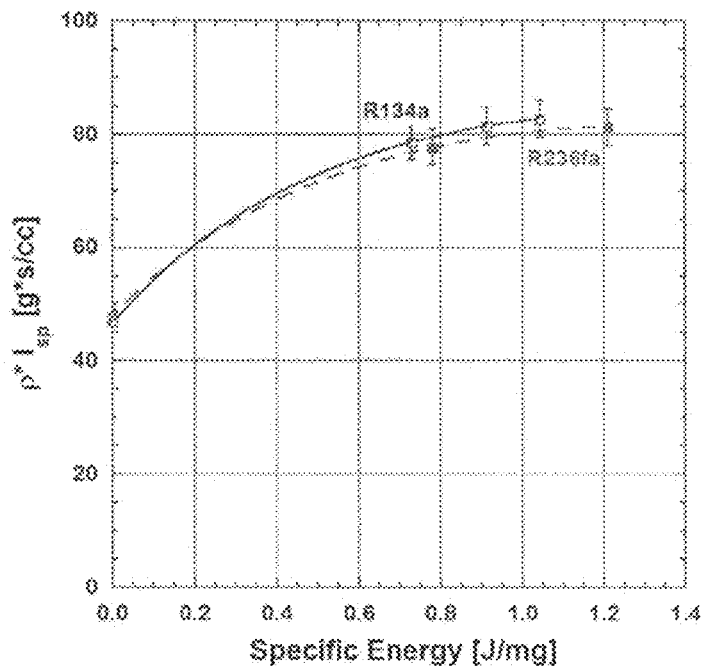
FIG. 14 is a diagram showing density $*I_{sp}$ product vs. specific energy for 25-30 mg/s R134a and R236fa.

Alternate Propellant—R236fa, an alternative propellant option for CHIPS, was tested on an older test apparatus. With a higher molecular weight, its nozzle performance is lower than R134a, but its increased liquid storage density largely makes up for the disparity. The performance of the CHIPS micro-resistojet with R236fa is compared with that of R134a in FIG. 13 and FIG. 14.

While this data is taken with slightly different flow conditions and a less refined apparatus, it highlights the merits of R236fa as a propellant. The density×$I_{sp}$ product is indicative of the total impulse available from a complete system, and R236fa nearly matches R134a with this metric. R236fa has a lower operating pressure than R134a, which can be advantageous when there are additional safety concerns. However, the lower pressure propellant requires more preheating and cannot achieve the same performance as R134a, so it is not the baseline propellant choice for CHIPS.

EFFICIENCY

Taking the highest performance case, we can assess the losses in the superheater cartridge and examine the efficiency of the system as a whole. By measuring the increase in temperature of the test fixture which holds the superheater cartridge, the combined radiation and conduction losses of the cartridge are calculated, Table 5.

TABLE 5

SHC Heat Loss Calculation

| Term | Value | Comments |
| --- | --- | --- |
| Test Fixture Mass [g] | 364 | 6061 Aluminum block |
| Test Duration [s] | 420 | — |
| Delta T [K] | 9 | Temperature increased 9 K |
| Power to Fixture [W] | 7 | Assumes constant $C_p$ of 0.896 J/g-K for aluminum |

This testing was performed at the same operating condition as the highest performing case shown in FIG. 10. Relevant parameters for this test case are shown in Table 6. Note that operation at the maximum specific impulse requires high superheater temperatures, and thus losses are maximized at this condition.

TABLE 6

Top Performing SHC Case Parameters

| Parameter | Value |
| --- | --- |
| Thrust [mN] | 30.2 |
| $I_{sp}$ [s] | 82.0 |
| Input Power [W] | 30.0 |
| Mass flow rate [mg/s] | 37.1 |

Given the 30 W of input power and losses of 7 W, the heating efficiency of the SHC is ~77%. The power required to evaporate R134a at the above flow rate is ~6.5 W. This means a low load on the tank heaters and minimal spacecraft heating during firing. Total thrust efficiency can be calculated from the terms above $\eta = T\ g_0\ I_{sp}/2\ P_0$. This results in a thrust efficiency of 40%. Considering the high molecular weight of R134a, this is a positive result. With a lower molecular weight propellant this would be much higher, but this is sacrificed for the total impulse capability of R134a and non-toxic, self-pressurizing properties.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A method for operating a resistively heated space thruster, which includes a chamber and nozzle downstream of the chamber and using a self-pressurizing propellant, the method comprising:
providing the self-pressurizing propellant, and wherein the self-pressurizing propellant is tetrafluroethane with a decomposition temperature between 250 and 400 degrees Celsius or hexafluropropane:
creating a propellant vapor from the self-pressurizing propellant;
heating the propellant vapor to an operating temperature in a range from 650 to 1110 degrees Celsius, measured along a wall defined by the chamber; and
setting a total residence exposure time of the propellant vapor in the chamber to less than 10 milliseconds, and wherein the total residence exposure time is defined by an equation set as:

$$T \propto \frac{L_C A_C}{a^* A^*}$$

where $L_c A_c$ is defined as a volume of the chamber $V_c$ and wherein $L_c$ is a length of the chamber, $A_c$ is a flow area of the chamber, $A^*$ is a throat area of the nozzle, and $a^*$ is a sonic velocity of the propellant vapor, and wherein the decomposition temperature of the self-pressurizing propellant is below the operating temperature such that the propellant vapor experiences a residence time in the thruster that is less than 10 milliseconds.

2. The method of claim 1, wherein an increased chamber temperature Tc increases a momentum impulse of the stored propellant.

3. The method of claim 1, wherein the chamber of the thruster is configured to produce thrust as either a warm-gas thruster or a cold-gas thruster.

4. The method of claim 1, wherein the chamber is a capillary tube, and wherein a tube wall defined by the capillary tube is heated with electrical current, directed radiation, or nuclear heat source.

5. The method of claim 1 wherein the chamber and nozzle are configured from a superheater cartridge.

* * * * *

UNITED STATES PATENT AND TRADEMARK OFFICE
CERTIFICATE OF CORRECTION

PATENT NO. : 9,909,574 B1
APPLICATION NO. : 15/143857
DATED : March 6, 2018
INVENTOR(S) : Neil J. Heimanowski et al.

It is certified that error appears in the above-identified patent and that said Letters Patent is hereby corrected as shown below:

In the Specification

In Column 1, Line 27, delete "ere" and insert --are--, therefor.

In Column 3, Line 11, delete "test" and insert --test.--, therefor.

In Column 4, Line 14, after "range of" insert --$I_{sp}$,--.

In Column 4, Line 44, delete "resistojet," and insert --resistojet.--, therefor.

In Column 4, Line 48, delete "choke" and insert --choice--, therefor.

In Column 5, Line 17, delete "pa" and insert --ρa--, therefor.

In Column 6, Line 24, delete "primary," and insert --primary--, therefor.

In Column 7, Line 55, delete "OA" and insert --0.4--, therefor.

In Column 8, Line 1, delete "vector," and insert --vector.--, therefor.

In Column 8, Line 2, delete "used," and insert --used.--, therefor.

In Column 10, Line 31, delete "(10 milliseconds)," and insert --(10 milliseconds).--, therefor.

Signed and Sealed this
Fifteenth Day of May, 2018

Andrei Iancu
*Director of the United States Patent and Trademark Office*